US012240016B2

(12) United States Patent
Kale

(10) Patent No.: US 12,240,016 B2
(45) Date of Patent: Mar. 4, 2025

(54) CLASSIFIER AND METHOD OF CLASSIFYING

(71) Applicant: Tebogo Kale, Benoni (ZA)

(72) Inventor: Tebogo Kale, Benoni (ZA)

(73) Assignee: Tebogo Kale, Benoni (ZA)

( * ) Notice: Subject to any disclaimer, the term of this patent is extended or adjusted under 35 U.S.C. 154(b) by 0 days.

(21) Appl. No.: 18/005,355

(22) PCT Filed: Jul. 16, 2021

(86) PCT No.: PCT/IB2021/056438
§ 371 (c)(1),
(2) Date: Jan. 13, 2023

(87) PCT Pub. No.: WO2022/013828
PCT Pub. Date: Jan. 20, 2022

(65) Prior Publication Data

US 2023/0278074 A1 Sep. 7, 2023

(30) Foreign Application Priority Data

Jul. 16, 2020 (ZA) ................................. 2020/04359

(51) Int. Cl.
*B03B 5/62* (2006.01)
*B03B 5/64* (2006.01)
(Continued)

(52) U.S. Cl.
CPC .................. *B07B 9/02* (2013.01); *B03B 5/62* (2013.01); *B03B 5/64* (2013.01); *B03B 5/66* (2013.01); *B07B 4/08* (2013.01); *B07B 11/06* (2013.01)

(58) Field of Classification Search
CPC .. B03B 5/62; B03B 5/623; B03B 5/64; B03B 5/66; B07B 4/08; B07B 11/06; B07B 4/02; B07B 9/02
(Continued)

(56) References Cited

U.S. PATENT DOCUMENTS 4,533,464 A * 8/1985 Smith ..................... B03B 13/00 209/172.5
4,554,066 A 11/1985 Turbitt et al.
(Continued)

FOREIGN PATENT DOCUMENTS

CN 109465195 A * 3/2019 ............... B07B 1/06

*Primary Examiner* — Gene O Crawford
*Assistant Examiner* — Muhammad Awais
(74) *Attorney, Agent, or Firm* — S.J. Intellectual Property LTD.

(57) ABSTRACT

This invention relates to a classifier for separating particles by size and density and a method of classifying particles by size and density. The classifier, which is also used in the method, includes an underflow outlet for conveying a first product out of the classifier; a fluidising means for introducing a fluidisation fluid into the classifier; a settling chamber for forming a hindered-settling zone, the settling chamber being in fluid flow communication with the fluidising means and the underflow outlet; a reflux chamber for forming a free-settling zone, the reflux chamber being in fluid flow communication with the settling chamber and having a cross-sectional area larger than that of the settling chamber; a launder in fluid flow communication with the reflux chamber for conveying a second product to an overflow outlet of the classifier; and an inlet conduit which projects into the classifier for introducing a feedstock into the classifier.

13 Claims, 4 Drawing Sheets

(51) Int. Cl.

| | |
|---|---|
| ***B03B 5/66*** | (2006.01) |
| ***B07B 4/08*** | (2006.01) |
| ***B07B 9/02*** | (2006.01) |
| ***B07B 11/06*** | (2006.01) |

(58) Field of Classification Search
USPC .............................. 209/138, 39, 143, 133, 13
See application file for complete search history.

(56) References Cited

U.S. PATENT DOCUMENTS

| | | | | | |
|---|---|---|---|---|---|
| 5,824,210 | A * | 10/1998 | Kuryluk | C02F 1/36 209/159 |
| 6,264,040 | B1 * | 7/2001 | Mankosa | B03B 11/00 209/172.5 |
| 6,425,485 | B1 * | 7/2002 | Mankosa | B03B 5/66 209/159 |
| 9,278,360 | B2 * | 3/2016 | Mankosa | B03D 1/1443 |
| 9,579,659 | B2 * | 2/2017 | Starr | B03B 5/623 |
| 2010/0155309 | A1 * | 6/2010 | Niitti | B03B 5/66 209/172.5 |
| 2016/0144376 | A1 | 5/2016 | Gardiner et al. | |
| 2018/0043370 | A1 * | 2/2018 | Grimm | B03B 5/623 |

* cited by examiner

CLASSIFIER AND METHOD OF CLASSIFYING

FIELD OF THE INVENTION

This invention relates to a classifier for separating particles by size and density and a method of classifying particles by size and density.

BACKGROUND TO THE INVENTION

In mineral processing it is often necessary to classify particles according to their size, and sometimes according to their density.

Classification is a method of separating mixtures of mineral particles into two or more products on the basis of the velocity with which the mineral particles settle (i.e., fall or sink) within a fluid medium. That is, mineral particles are separated into two or more products by utilising their respective settling velocities in a fluid medium. In mineral processing the fluid medium is usually water. Wet classification is generally applied to mineral particles which are considered too fine to be sorted efficiently be means of screening.

Classifiers consist of a sorting column in which a fluid is rising at a uniform rate. Particles introduced into the sorting column either sink or rise according to whether their terminal velocities are greater or less than the upward velocity of the fluid. A particle reaches its terminal velocity when an equilibrium is attained between the gravitational and fluid resistance forces which acts on the particle.

Therefore, the sorting column separates the feed into two products—an overflow consisting of particles with terminal velocities less than the velocity of the fluid and an underflow consisting of particles with terminal velocities greater than the velocity of the fluid.

Reflux classifiers which incorporate a plurality of inclined parallel plates, or lamellae, are known. The plurality of inclined parallel plates, or lamellae, form a plurality of inclined channels. Various feed methods are employed so that a slurry containing particles of differing sizes and densities passes into each inclined channel. Particles having a diameter or density greater than a specified value settles, under the action of gravity, towards an inclined plate or lamella. Once settled on the inclined plate or lamella, the particle slides down the inclined plate or lamella and reports to the underflow. Particles having a diameter or density less than a specified value do not settle on an inclined plate or lamella. Rather, these particles travel through the inclined channels and report to the overflow. In this manner, particles having differing sizes and densities are separated.

The principal advantage of inclined-plate classifiers is the increased solids recirculation capacity per unit of plane area. However, inclined-plate classifiers also have major disadvantages. A major disadvantage of inclined-plate classifiers is their complex design and associated capital cost. Furthermore, the various channels between the inclined plates or lamellae often foul and are difficult to clean.

On the other hand, other classifiers only consist of an elongated settling area, which serves as a classifying area. However, these classifiers have poor recoveries as misplaced material is not recovered. Material immediately moves to the overflow launder.

OBJECT OF THE INVENTION

It is an object of the present invention to provide a classifier for separating particles by size and density and a method of classifying particles by size and density with which the applicant believes the above disadvantages would at least partially be addressed or which would provide a useful alternative to known classifiers and methods of classifying particles.

SUMMARY OF THE INVENTION

According to a first aspect of the present invention, there is provided an elongate classifier for separating particles of a feedstock according to size and density in a fluidised bed comprising the feedstock and a rising fluidisation fluid, the elongate classifier including:—

- an underflow outlet for conveying a first product out of the elongate classifier;
- a fluidising means for introducing the fluidisation fluid into the elongate classifier;
- a settling chamber for forming a hindered-settling zone in the fluidised bed so as to increase the effect of particle density on the separation of the particles in the fluidised bed, the settling chamber being in fluid flow communication with the fluidising means and the underflow outlet;
- a reflux chamber for forming a free-settling zone in the fluidised bed so as to increase the effect of particle size on the separation of the particles in the fluidised bed, the reflux chamber being in fluid flow communication with the settling chamber and having a cross-sectional area larger than a cross-sectional area of the settling chamber;
- a launder in fluid flow communication with the reflux chamber for conveying a second product to an overflow outlet of the elongate classifier; and
- an inlet conduit which projects into the elongate classifier for introducing the feedstock into the elongate classifier.

The feedstock may be a mixture of solid particles. Alternatively, the feedstock may be a mixture of solid particles suspended in a fluid. For example, the feedstock may be a slurry.

The ratio of the cross-sectional area of the settling chamber to the cross-sectional area of the reflux chamber may be between 1:1.4, 1:2, or greater.

The solid particles may be of differing sizes and/or densities. The solid particles may be coal particles, ore particles, metalliferous particles, metal particles or mineral particles. The particles may have a diameter of between 0.05 mm and 4 mm. The fluidisation fluid may be a liquid or a gas. The liquid may be water. The gas may be pressurised air.

The fluidising means may take the form of a fluidising chamber having a fluidising plate. The fluidisation fluid may be introduced into the fluidising means at pressure and forced through apertures in the fluidising plate. The fluidising plate may locate above an underflow collection area in the fluidising chamber. There is provided for the fluidising means to include a plurality of jets which are directed towards a top portion of the elongate chamber. The jets may locate in the apertures and include a thread which is complimentary to a thread formed in the apertures through the fluidising plate.

An inlet of the underflow outlet may be formed in a base of the underflow collection area. A valve may control a flowrate of the first product through the underflow outlet. A process control means may be connected to the valve, the process control means serving to operate the valve to control the flowrate of the first product through the underflow outlet based on pressure measurements made in the settling chamber.

The settling chamber may have a uniform cross-sectional area throughout.

The reflux chamber may comprise a lower chamber and an upper chamber. The cross-sectional area of the lower chamber may gradually increase towards the upper chamber. That is, side walls of the lower chamber may flare outwardly towards side walls of the upper chamber.

A vibration or agitation means may be provided to vibrate or agitate the elongate classifier for encouraging particles that have a density greater than that of other particles in the fluidised bed to settle faster within the fluidising fluid.

The launder may form a channel around a portion of the reflux chamber for receiving the second product as an overflow of the upper chamber.

The inlet conduit may have an outlet which locates in the lower chamber of the reflux chamber. The inlet conduit may project into the elongate classifier through a centre region of a safety lid which locates on top of the launder.

The safety lid may locate on top of the launder and across the channel formed by the launder. The safety lid may ensure that an overflow of the elongate classifier falls within the channel formed by the launder and that no foreign material enters the elongate classifier or the launder.

According to a second aspect of the invention, there is provided a method of classifying particles of a feedstock according to size and density in a fluidised bed, the method including the steps of:—

- providing an elongate classifier having:
  - an underflow outlet;
  - a fluidising means;
  - a settling chamber which is in fluid flow communication with the fluidising means and the underflow outlet;
  - a reflux chamber which is in fluid flow communication with the settling chamber, the reflux chamber having a cross-sectional area larger than a cross-sectional area of the settling chamber;
  - a launder which is in fluid flow communication with the reflux chamber; and
  - an inlet conduit which projects into the elongate chamber;
- feeding the feedstock via the inlet conduit into the elongate conduit;
- introducing a fluidisation fluid into the elongate chamber via the fluidising means;
- permitting the fluidisation fluid to rise within the elongate chamber towards the reflux chamber;
- forming a fluidised bed in the elongate classifier, the fluidised bed comprising the feedstock and the rising fluidisation fluid;
- forming a hindered-settling zone in the settling chamber for increasing the effect of particle density on the separation of the particles in the fluidised bed;
- forming a free-settling zone in the reflux chamber for increasing the effect of particle size on the separation of the particles in the fluidised bed;
- conveying a first product out of the elongate classifier via the underflow outlet; and
- conveying a second product from the classifier via the launder.

BRIEF DESCRIPTION OF THE DRAWINGS

The invention will now be described further, by way of example only, with reference to the accompanying drawings wherein.

DETAILED DESCRIPTION OF THE DRAWINGS

Figure 1:
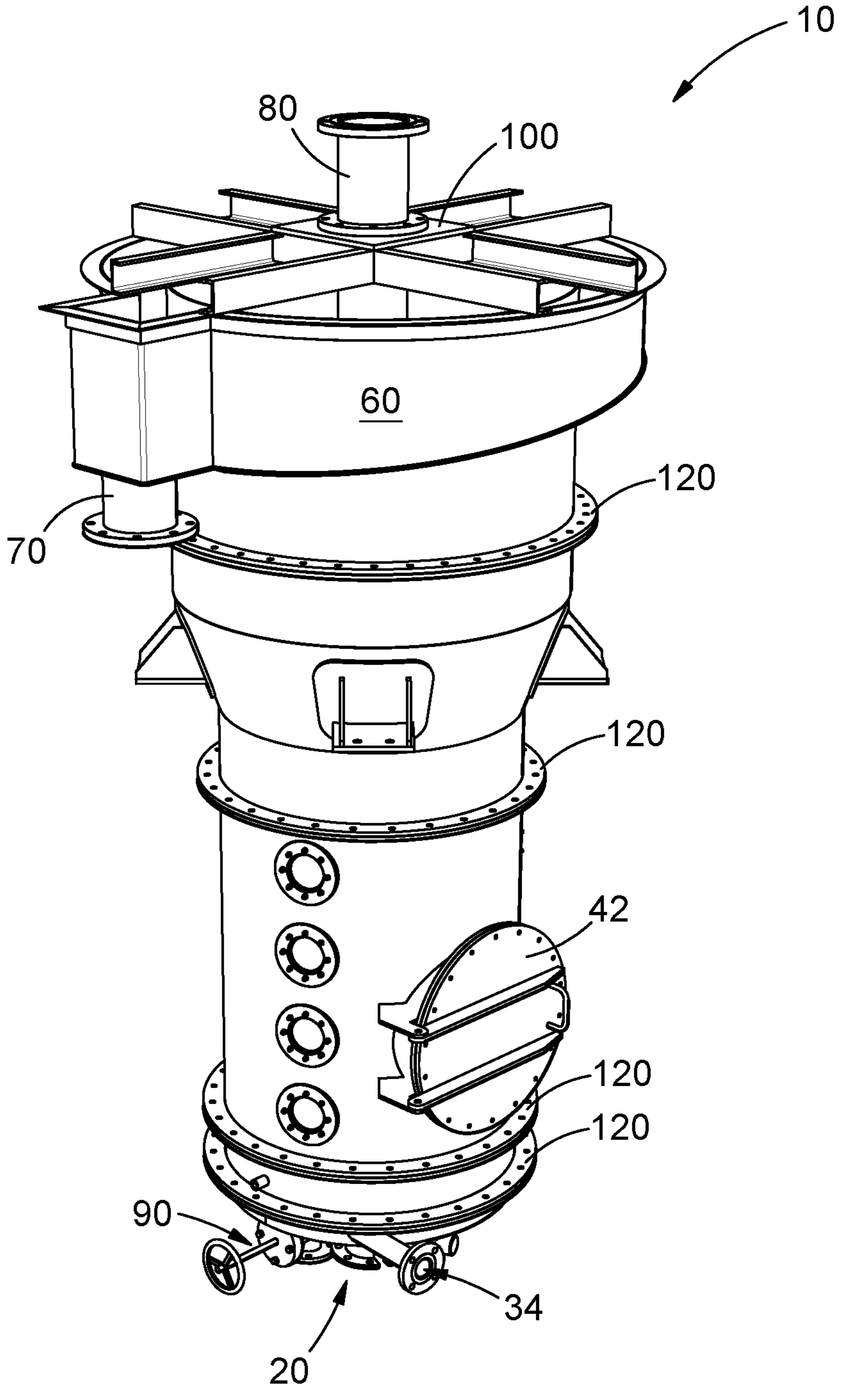
FIG. 1 is a perspective view of the elongate classifier according to a first aspect of the invention.

With reference to the drawings, in which like numerals refer to like features, an elongate classifier for separating particles of a feedstock according to size and density in a fluidised bed comprising the feedstock and a rising fluidisation fluid in accordance with the invention is generally indicated by reference numeral 10.

As shown in the Figures, the elongate classifier 10 includes:

- an underflow outlet 20 for conveying a first product (not shown) out of the elongate classifier 10;
- a fluidising means 30 for introducing the fluidisation fluid (not shown) into the elongate classifier 10;
- a settling chamber 40 for forming a hindered-settling zone in the fluidised bed (not shown) so as to increase the effect of particle density on the separation of the particles (not shown) in the fluidised bed (not shown), the settling chamber 40 being in fluid flow communication with the fluidising means 30 and the underflow outlet 20;
- a reflux chamber 50 for forming a free-settling zone in the fluidised bed (not shown) so as to increase the effect of particle size on the separation of the particles (not shown) in the fluidised bed (not shown), the reflux chamber 50 being in fluid flow communication with the settling chamber 40 and having a cross-sectional area larger than a cross-sectional area of the settling chamber 40;
- a launder 60 in fluid flow communication with the reflux chamber 50 for conveying a second product (not shown) to an overflow outlet 70 of the elongate classifier 10; and
- an inlet conduit 80 which projects into the elongate classifier 10 for introducing the feedstock (not shown) into the elongate classifier 10.

Figure 3:
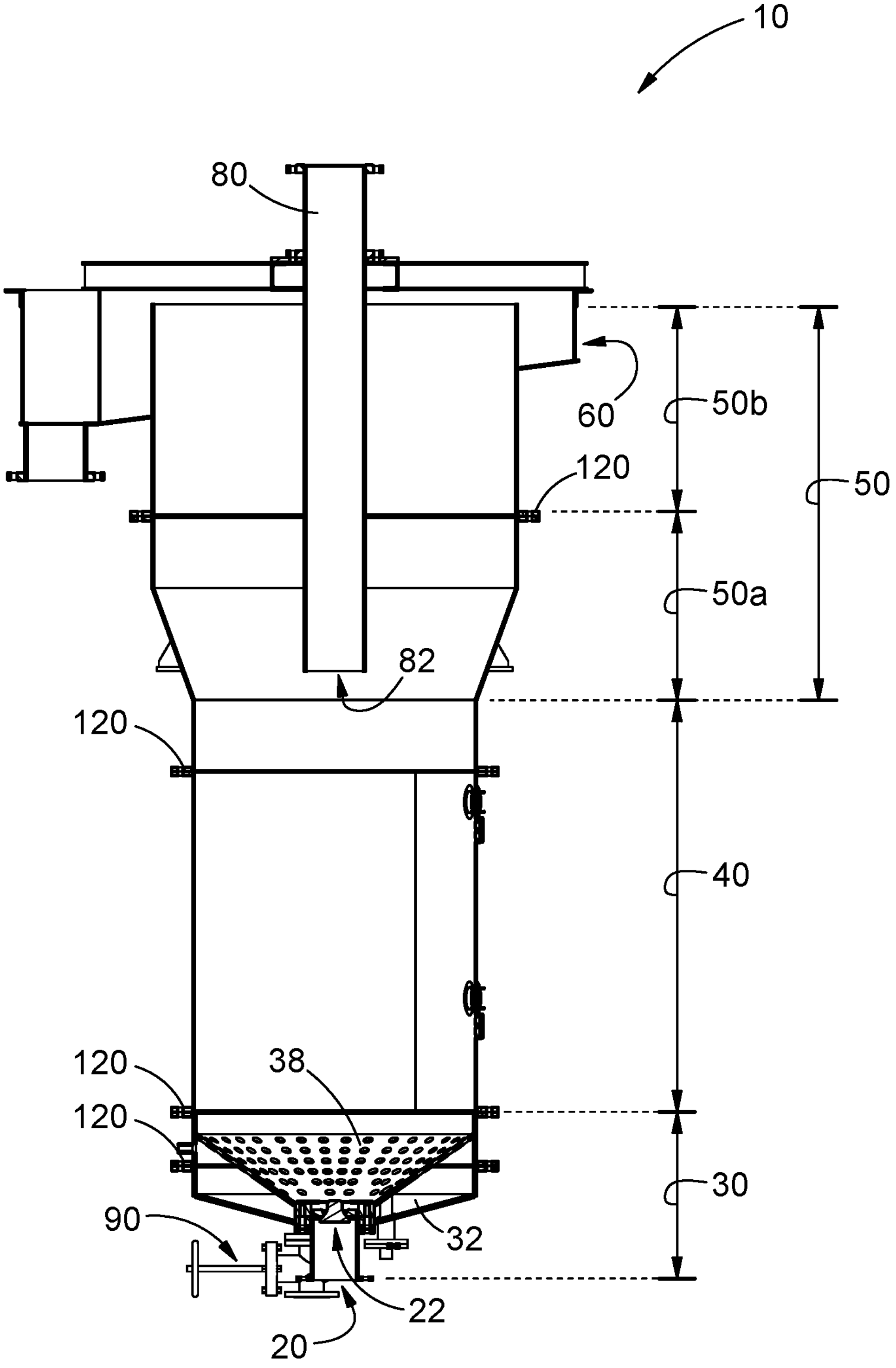
FIG. 3 is a sectioned elevation view along line III-III in FIG. 2.
Figure 4:
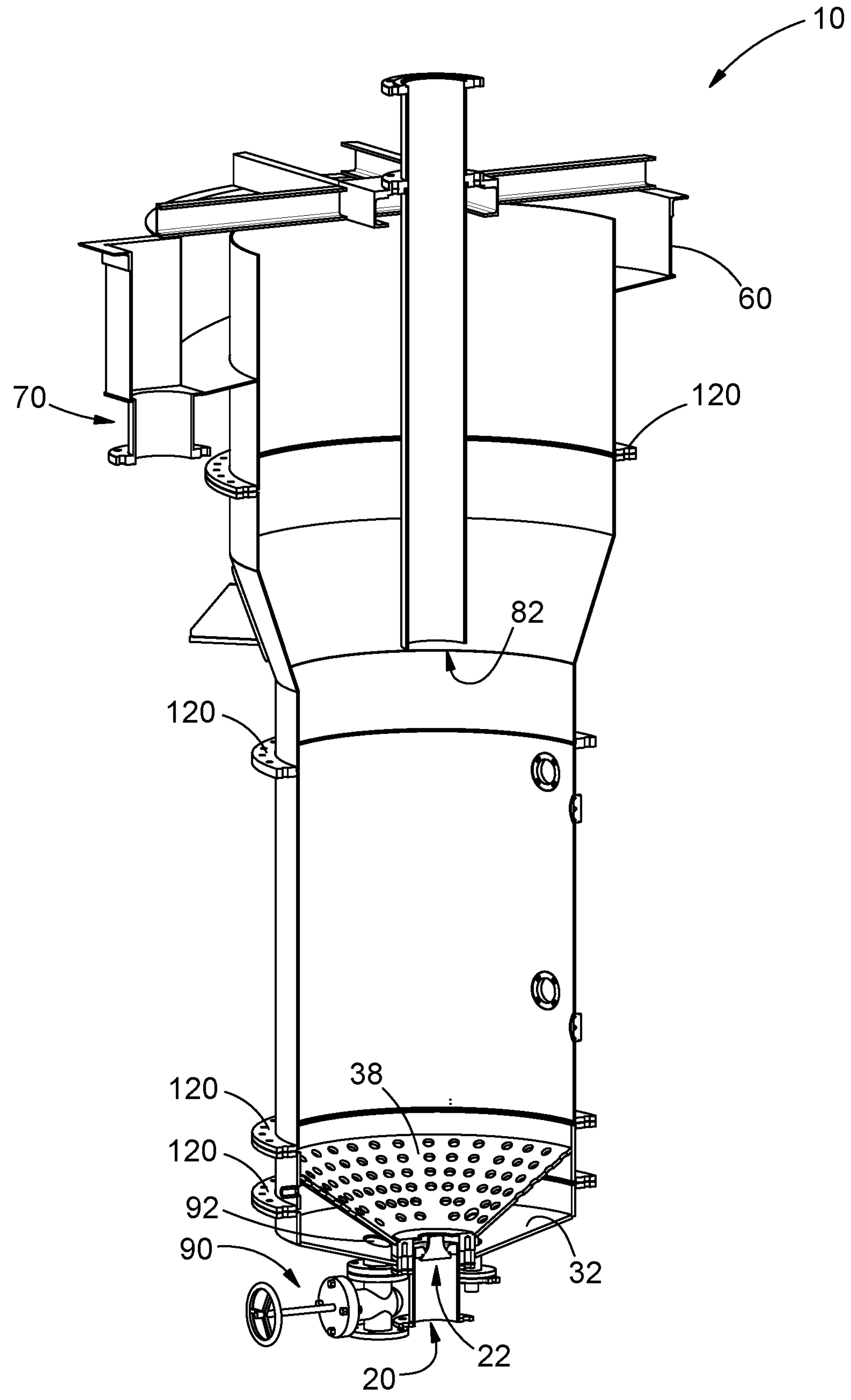
FIG. 4 is a sectioned perspective view along line III-III in FIG. 2.

As best shown in FIGS. 3 and 4, a valve 22 locates between a base plate 32 of an underflow collection area (which locates in the fluidising means 30) and the underflow outlet 20. The valve 22 is arranged to control a flowrate of the first product (not shown) through the underflow outlet 20. A process control means (not shown) is connected to the valve 22 and serves to open and close the valve 22. The process control means (not shown) is connected to at least two pressure sensors (not shown) which are located in the settling chamber 40.

As shown in FIG. 4, an inlet 92 of a pressure relief valve 90 locates in the base plate 32 of the underflow collection area. During operation of the elongate classifier 10, the pressure relief valve 90 may be opened to dump the contents of the elongate classifier 10.

The fluidising means 30 includes an inlet 34 for introducing a pressurised fluidisation fluid (not shown) into the elongate classifier 10. The pressurised fluidisation fluid is forced through jets (not shown) fitted in the apertures of a fluidising plate 38.

Figure 2:
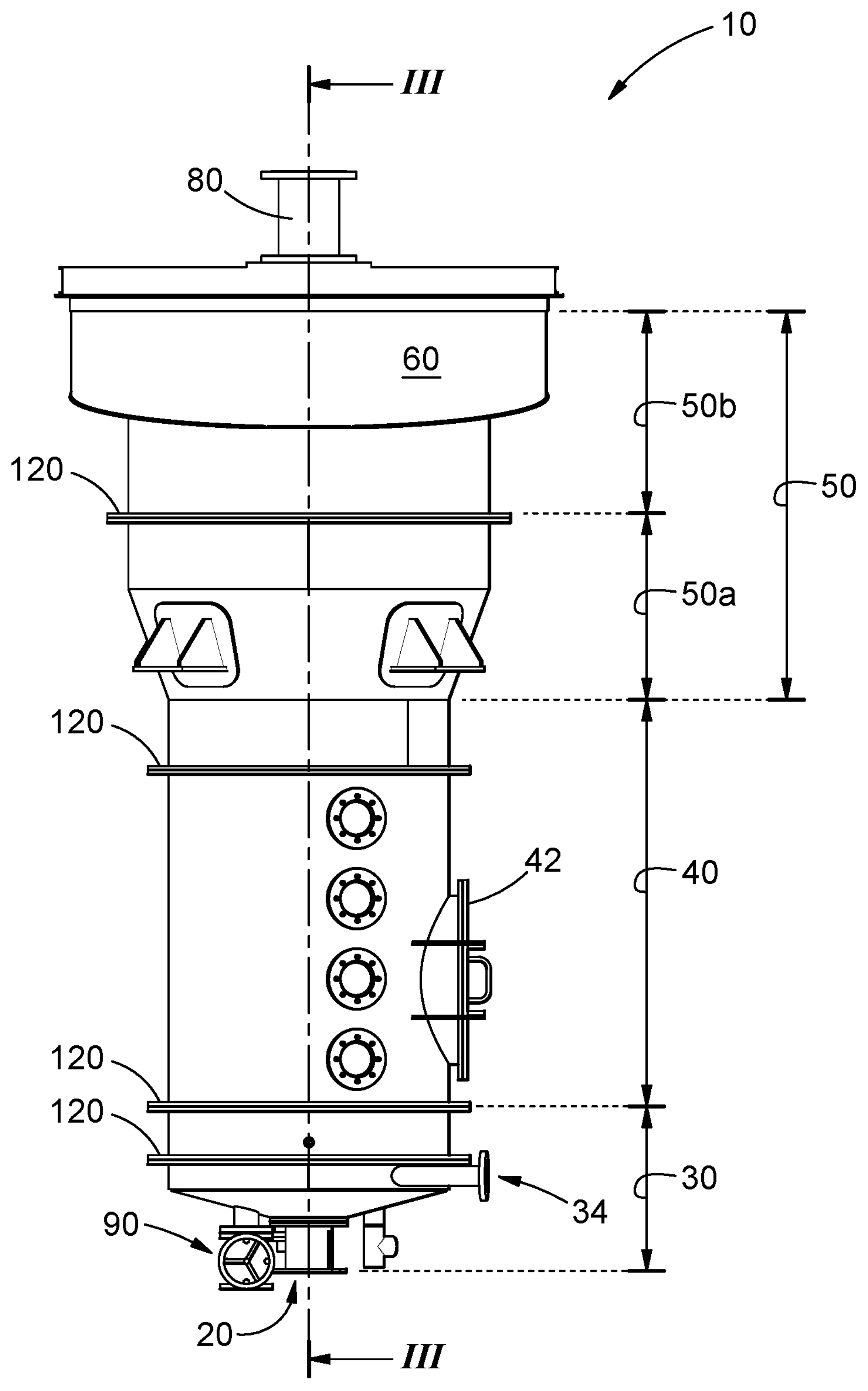
FIG. 2 is an elevation view of the classifier shown in FIG. 1.

The settling chamber 40 has a substantially constant cross-sectional area relative to a longitudinal axis (represented by line III-III in FIG. 2) of the elongate classifier 10. The settling chamber 40 is in fluid flow communication with the fluidising means 30, the underflow outlet 20, and the reflux chamber 50. A hatch door 42 is provided in the settling chamber 40 to facilitate access to and cleaning of an inside of the elongate classifier 10.

In use, a hindered-settling zone in the fluidised bed (not shown) is formed in the settling chamber 40. As the concentration of particles in the fluidised bed increases, the effect of particle crowding becomes more apparent and the settling (i.e., falling or sinking) rate of the particles decrease. Hindered-settling conditions reduce the effect of particle size and increase the effect of particle density on the separation of the particles in a fluidised bed.

The reflux chamber 50 locates above and is in fluid flow communication with the settling chamber 40. In a preferred embodiment of the invention, the reflux chamber 50 comprises a lower chamber 50*a* and an upper chamber 50*b*. As shown in the Figures, the reflux chamber 50 has a cross-sectional area relative to the longitudinal axis of the elongate classifier 10 greater than that of the settling chamber 40. It is the enlargement of the cross-sectional area of the reflux chamber 50 relative to that of the settling chamber 40 which, in use, creates an autogenous dense media in a top portion of the settling chamber 40. The formation and working of the autogenous dense media are discussed in more detail below.

In use, a free-settling zone in the fluidised bed (not shown) is formed in the reflux chamber 50. Free-settling refers to the settling (i.e., falling or sinking) of particles in a volume of fluid (e.g., fluidised bed) which is large with respect to the total volume of particles, hence particle crowding is negligible. Free-settling conditions reduce the effect of particle density and increase the effect of particle size on the separation of particles in a fluidised bed.

The launder 60 surrounds a top peripheral region of the reflux chamber 50. The launder 60 serves to convey a second product (not shown) to an overflow outlet 70. The inlet conduit 80 projects into the elongate classifier 10 through a safety lid 100 which locates on top of the launder 60 and across the channel formed by the launder 60. More particularly, the inlet conduit 80 projects into the elongate classifier 10 through a centre region of the safety lid 100. The safety lid 100 is only partially shown in the Figures. As is best shown in FIG. 3, the inlet conduit 80 projects into the elongate classifier 10 so that an outlet 82 of the inlet conduit 80 locates in the lower chamber 50*b* of the reflux chamber 50.

The elongate classifier 10 may be of unitary construction. However, to facilitate transportation of the elongate classifier 10, various portions of the elongate classifier may be attached to one another via flanges 120 which extend outwardly from the various portions of the elongate classifier 10.

In use, a feedstock (e.g. slurry) comprising water and particles having differing sizes (e.g. diameters of between 0.05 and 4 mm) and differing densities are fed to the elongate classifier 10 via the inlet conduit 80. The slurry exists the inlet conduit 80 via the outlet 82 and locates in the lower chamber 50*a*.

Fluidisation fluid (e.g. water) is introduced into the elongate classifier 10 via the fluidising means 30. Here, the fluidisation fluid enters through an inlet 34 and is conveyed to the jets (not shown) located in the fluidising plate 38. The jets (not shown) force the fluidisation fluid at pressure into the settling chamber 40. In this manner, the fluidisation fluid mixes with the feedstock and forms a fluidised bed within the elongate classifier 10. The flow rate of the fluidisation fluid into the elongate classifier 10 is such that the fluidised bed continues to rise at a rising velocity within the elongate classifier towards the reflux chamber 50.

Due to particle crowding, a hindered-settling zone is formed in the settling chamber 40. Therefore, particles (not shown) in the fluidised bed (not shown) are separated in the settling chamber 40 based mainly on their respective densities. Here, if two particles (not shown) have the same size (i.e., diameter), then the particle (not shown) having a higher density will have a higher terminal velocity. Therefore, particles (not shown) having a higher terminal velocity than a velocity with which the fluidised bed (not shown) rises in the settling chamber 40 settle towards the base plate 32 of the fluidising chamber 30. These particles form a dense bed at a bottom region of the settling chamber 40 which inhibits particles having a relatively low density, but relatively large size from entering the fluidising chamber 30. Particles having a relatively high density and relatively large size, compared to that of other particles in the fluidising bed, are removed from the elongate classifier 10, via the underflow outlet 20, as the first product.

Particles (not shown) having a lower terminal velocity than a velocity with which the fluidised bed (not shown) rises in the settling chamber 40 are carried upwardly towards the reflux chamber 50.

The enlarged cross-sectional area of the reflux chamber 50 (as compared to the cross-sectional area of the settling chamber 40) causes a free-settling zone to form in the reflux chamber 50. Therefore, particles (not shown) in the fluidised bed (not shown) are separated in the reflux chamber 50 based mainly on their respective sizes (i.e., diameters). Here, if two particles (not shown) have the same density, then the particle (not shown) having a larger size (i.e., diameter) will have the higher terminal velocity. In this manner, particles (not shown) having a higher terminal velocity than a velocity with which the fluidised bed (not shown) rises in the reflux chamber 50 settles downwards in the elongate classifier 10 and towards the settling chamber 40. These particles (not shown) form an autogenous dense media (not shown) at a bottom region of the reflux chamber 50 and at a top region of the settling chamber 40. The autogenous dense media (not shown) encourages particles having a relatively low density to rise towards an upper edge region of the upper chamber 50*b*. During continued operation of the elongate classifier 10, these fine particles spill over the upper edge region of the upper chamber 50*b* and into the launder 60 where it is removed as the second product (not shown).

Particles (not shown) having a terminal velocity less than the velocity with which the fluidised bed (not shown) rises in the reflux chamber 50 are carried upwardly towards the upper chamber 50*b*. Eventually, these particles (not shown) spill over the upper edge of the upper chamber 50*b* and falls within the channel of the launder 60. The launder 60 conveys these particles (not shown), as the second product (not shown) towards the overflow outlet 70.

A process control means is connected to the valve 22. The process control means serves to operate the valve 22 so as to control the flowrate of the first product (not shown) through the underflow outlet 20 based on pressure measurements made by at least two pressure sensors (not shown) located in the settling chamber 40.

Experimental Results Showcasing the Advantages of the Classifier 10 and Method of Classifying Particles by Size and Density A classifier 10 having a ratio of 1:1.5 of the cross-sectional area of its settling chamber 40 to the cross-sectional area of its reflux chamber 50 was used to generate the below experimental results.

First Experiment

The classifier 10 was used to upgrade a low-grade coal feedstock to a higher-grade coal product.

The feedstock fed to the classifier 10 via inlet conduit 80, was a spiral product comprising 64 kilograms of a mixture of coal and ash particles. More particularly, the feedstock mixture comprised:

51.968 kilograms of coal particles having a calorific value of 24.2 kilojoules per kilogram; and 12.032 kilograms of ash.

The particles in the feedstock were separated according to size and density in a fluidised bed consisting of the feedstock and water (i.e., the fluidising fluid).

The first product taken from the underflow 20 of the elongate classifier 10 weighed 13 kilograms and comprised:

7.8 kilograms of coal particles having a calorific value of 17.2 kilojoules per kilogram; and 5.2 kilograms of ash.

The second product taken from the overflow outlet 70 of the elongate classifier 10 weighed 51 kilograms and comprised:

43.503 kilograms of coal particles having a calorific value of 26.1 kilojoules per kilogram; and 14.797 kilograms of ash.

As is clear from the above results, the elongate classifier 10 provides a simple, yet effective means of classifying particles based on size and density.

Second Experiment

The classifier 10 was used to produce a plus 63 weight percentage iron product.

The feedstock fed to the classifier 10 via inlet conduit 80, comprised 81.2 kilograms of a mixture containing 47.275 kilograms of ultra-fine iron particles.

The particles in the feedstock were separated according to size and density in a fluidised bed consisting of the feedstock and water (i.e., the fluidising fluid).

The first product taken from the underflow 20 of the elongate classifier 10 weighed 50.6 kilograms and contained 32.328 kilograms of ultra-fine iron particles.

The second product taken from the overflow outlet 70 of the elongate classifier 10 weighed 30.6 kilograms and contained 10.092 kilograms of ultra-fine iron particles.

Therefore, a feedstock containing 58.22 weight percentage ultra-fine particles were upgraded to a product containing 63.89 weight percentage ultra-fine particles.

As is again clear from the above results, the elongate classifier 10 provides a simple, yet effective means of classifying particles based on size and density.

Advantageously, the above-described elongate classifier 10 and method of classifying provides for a simple, yet effective means of classifying particles based on size and density. The applicant found that the elongate classifier 10 is easier to operate and maintain than the conventional lamellae plate classifiers. The enlargement of the cross-sectional area of the reflux chamber 50 relative to the cross-sectional area of the settling chamber 40 provides a simple, but effective means, of creating an autogenous dense media in the elongate classifier 10. The autogenous dense media results in an increased particle recirculation capacity per unit of cross-sectional area.

It will be appreciated by those skilled in the art that the invention is not limited to the precise details as described herein and that many variations are possible without departing from the scope and spirit of the invention.

The description is presented in the cause of providing what is believed to be the most useful and readily understandable description of the principles and conceptual aspects of the invention. In this regard, no attempt is made to show and/or describe structural details of the invention in more detail than is necessary for a fundamental understanding of the invention. The words used should therefore be interpreted as words of description rather than words of limitation.

What is claimed is:

1. An elongate classifier for separating particles of a feedstock according to size and density in a fluidised bed comprising the feedstock and a rising fluidisation fluid, the elongate classifier including:

an underflow outlet for conveying a first product out of the elongate classifier;

a fluidising means for introducing the rising fluidisation fluid into the elongate classifier;

a settling chamber for forming a hindered-settling zone in the fluidised bed so as to increase the effect of particle density on the separation of the particles in the fluidised bed, the settling chamber being in fluid flow communication with the fluidising means and the underflow outlet;

a reflux chamber for forming a free-settling zone in the fluidised bed so as to increase the effect of particle size on the separation of the particles in the fluidised bed, wherein the reflux chamber comprises a lower chamber and an upper chamber, and wherein a cross-sectional area of the lower chamber increases gradually towards the upper chamber, the reflux chamber being in fluid flow communication with the settling chamber and having a cross-sectional area larger than a cross-sectional area of the settling chamber;

a launder in fluid flow communication with the reflux chamber for conveying a second product to an overflow outlet of the elongate classifier;

an inlet conduit which projects into the elongate classifier for introducing the feedstock into the elongate classifier; and a vibrator or agitator to vibrate or agitate the elongate classifier for encouraging particles that have a density greater than that of other particles in the fluidised bed to settle faster within the rising fluidising fluid.

2. The elongate classifier of claim 1, wherein the feedstock comprises a mixture of solid particles or a mixture of solid particles which are suspended in a fluid.

3. The elongate classifier of claim 1, wherein a ratio of the cross-sectional area of the settling chamber to the cross-sectional area of the reflux chamber is between 1:1.4 and 1:2.

4. The elongate classifier of claim 1, wherein the rising fluidisation fluid is a liquid or a gas.

5. The elongate classifier of claim 1, wherein the fluidising means take the form of a fluidising chamber having a fluidising plate which locates above an underflow collection area of the elongate classifier and wherein the rising fluidisation fluid is introduced into the fluidising means at a pressure and forced through apertures in the fluidising plate.

6. The elongate classifier of claim 5, wherein the fluidising means includes a plurality of jets which are directed towards a top portion of the fluidising chamber, the jets locating in the apertures and including a thread which is complimentary to a thread formed in the apertures.

7. The elongate classifier of claim 5 or claim 6, wherein an inlet of the underflow outlet is formed in a base of the underflow collection area.

8. The elongate classifier of claim 1, wherein a valve controls a flowrate of the first product through the underflow outlet.

9. The elongate classifier of claim 8, wherein a process controller is connected to the valve, the process controller serving to operate the valve so as to control the flowrate of the first product through the underflow outlet based on pressure measurements made in the settling chamber.

10. The elongate classifier of claim 1, wherein the launder forms a channel around a portion of the reflux chamber for receiving the second product as an overflow of the upper chamber.

11. The elongate classifier of claim 1, wherein the inlet conduit has an outlet which locates in the lower chamber of the reflux chamber.

12. A method of classifying particles of a feedstock according to size and density in a fluidised bed, the method including the steps of:

providing an elongate classifier having:

an underflow outlet;

a fluidising means;

a settling chamber which is in fluid flow communication with the fluidising means and the underflow outlet;

a reflux chamber which is in fluid flow communication with the settling chamber, the reflux chamber having a cross-sectional area larger than a cross-sectional area of the settling chamber and wherein the reflux chamber comprises a lower chamber and an upper chamber, and wherein a cross-sectional area of the lower chamber increases gradually towards the upper chamber;

a vibrator or agitator;

a launder which is in fluid flow communication with the reflux chamber; and an inlet conduit which projects into the elongate chamber;

feeding the feedstock via the inlet conduit into the elongate classifier;

introducing a fluidisation fluid into the elongate chamber via the fluidising means;

permitting the fluidisation fluid to rise within the elongate chamber towards the reflux chamber;

forming a fluidised bed in the elongate classifier, the fluidised bed comprising the feedstock and the rising fluidisation fluid;

vibrating or agitating the elongate classifier for encouraging particles that have a density greater than that of other particles in the fluidised bed to settle faster within the rising fluidising fluid;

forming a hindered-settling zone in the settling chamber for increasing the effect of particle density on the separation of the particles in the fluidised bed;

forming a free-settling zone in the reflux chamber for increasing the effect of particle size on the separation of the particles in the fluidised bed;

conveying a first product out of the elongate classifier via the underflow outlet; and conveying a second product from the classifier via the launder.

13. The elongate classifier of claim 6, wherein an inlet of the underflow outlet is formed in a base of the underflow collection area.

* * * * *